A. C. FISCHER.
ENGINE.
APPLICATION FILED FEB. 15, 1917.
1,349,054.
Patented Aug. 10, 1920.
5 SHEETS—SHEET 2.
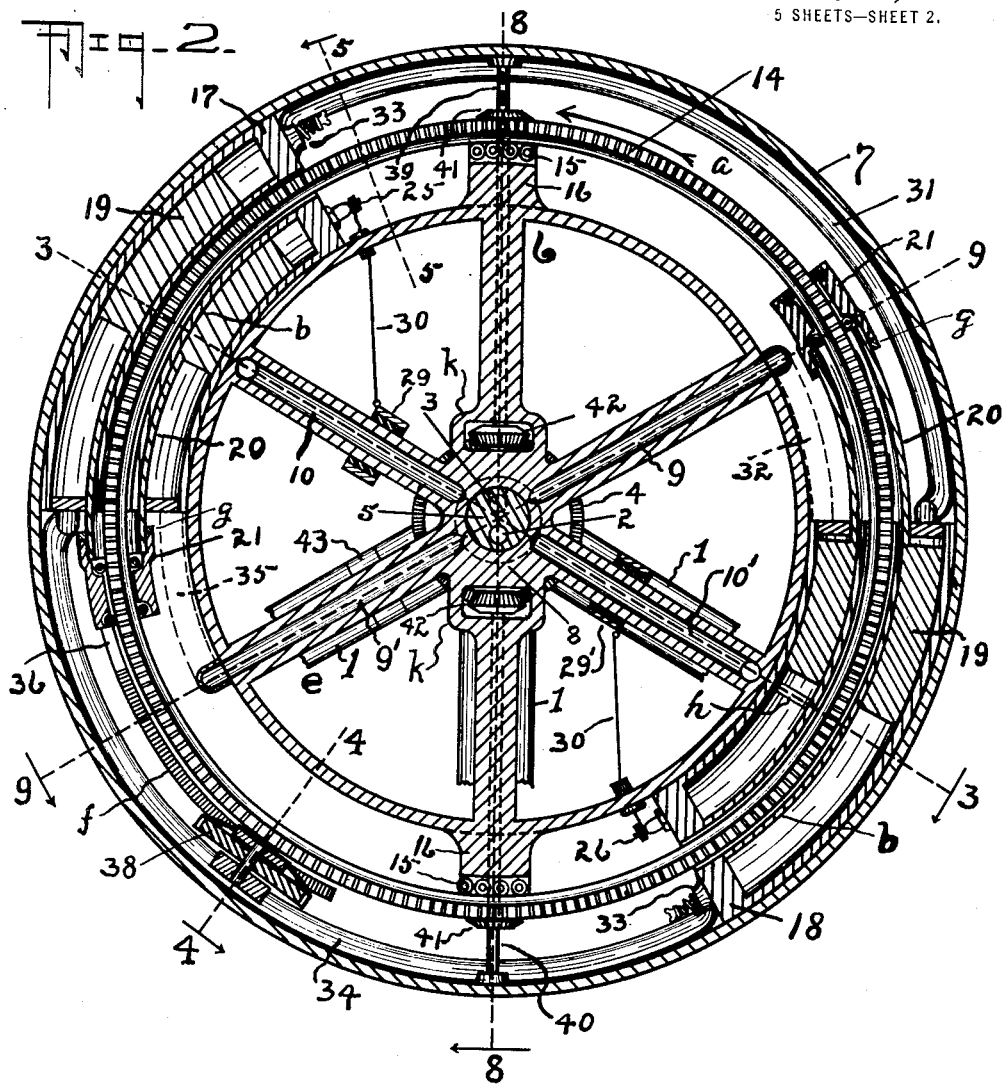
Inventor
Albert C. Fischer,
By Hiram A. Sturges.
Attorney

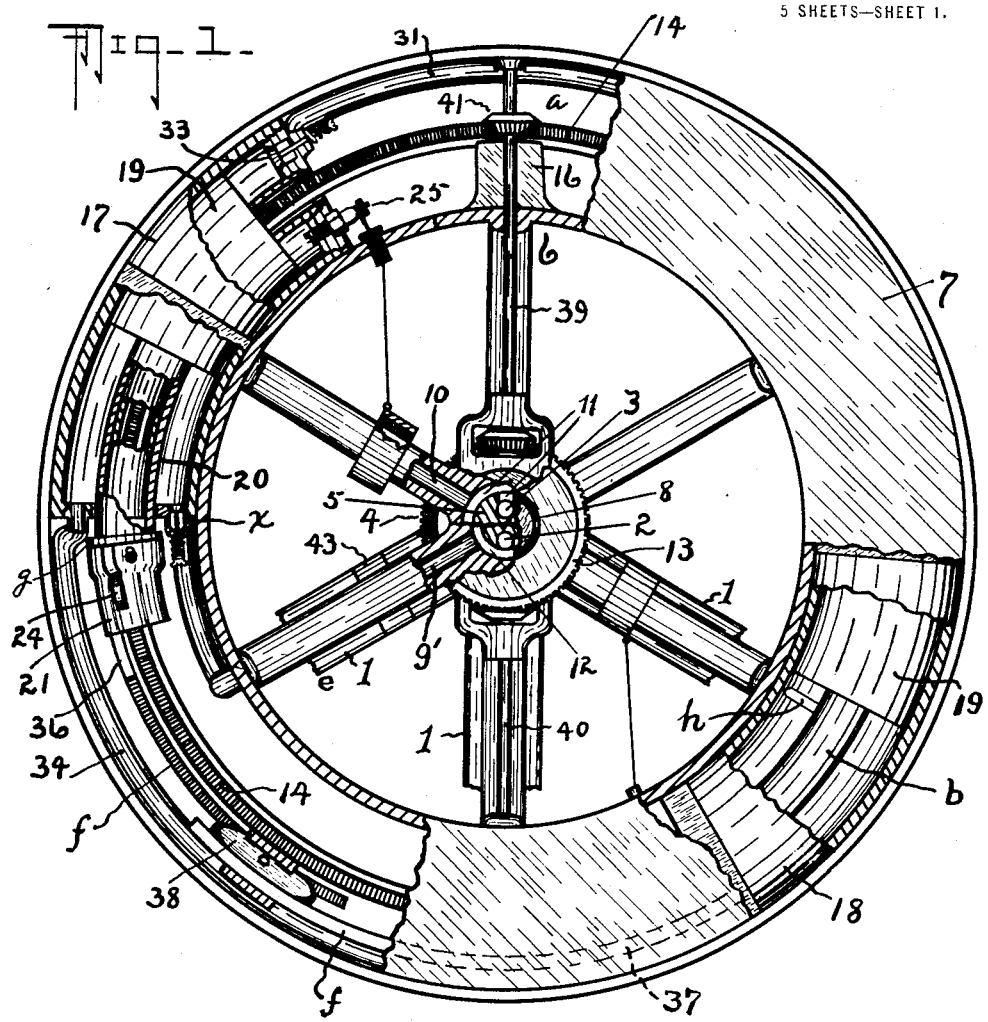

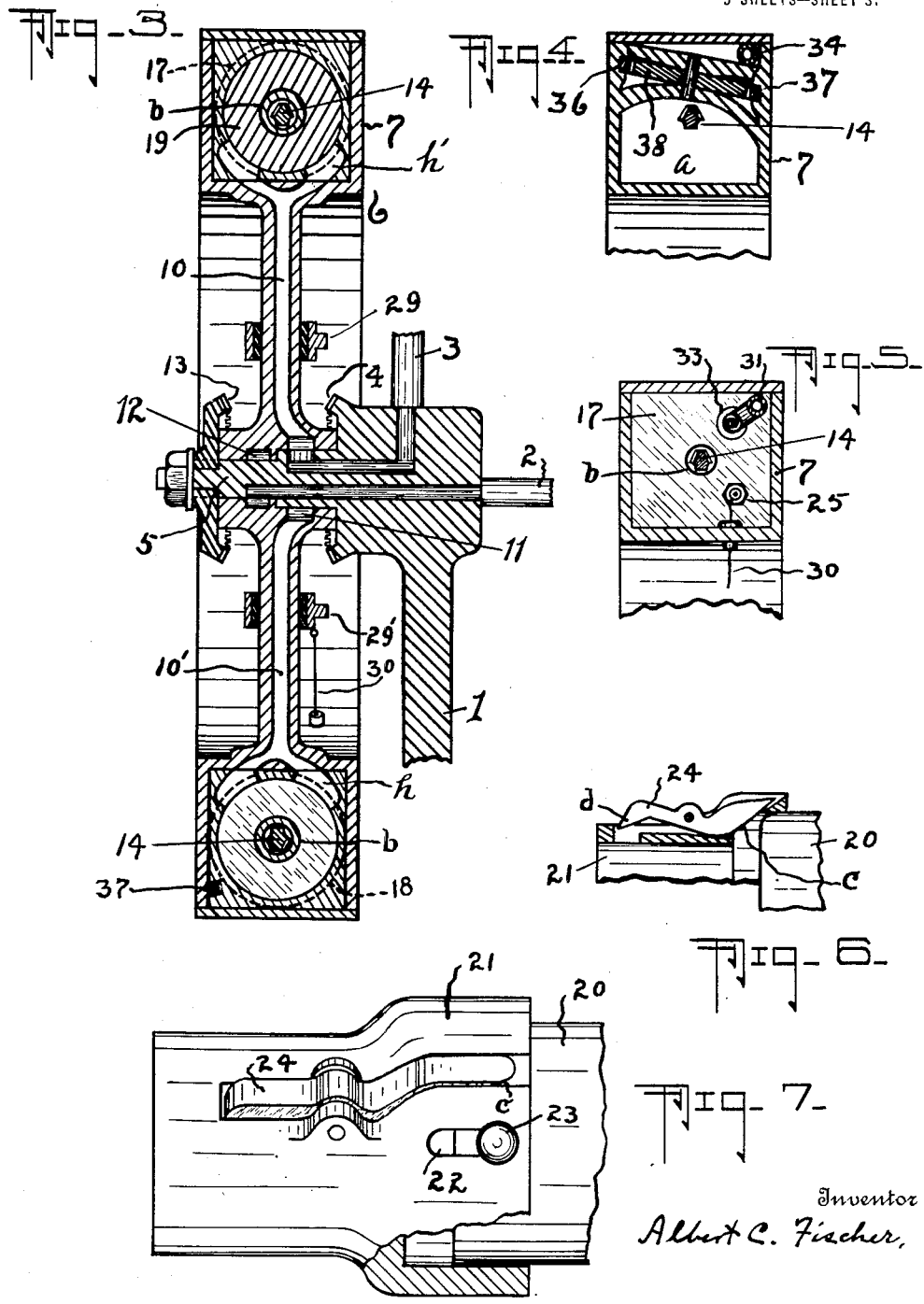

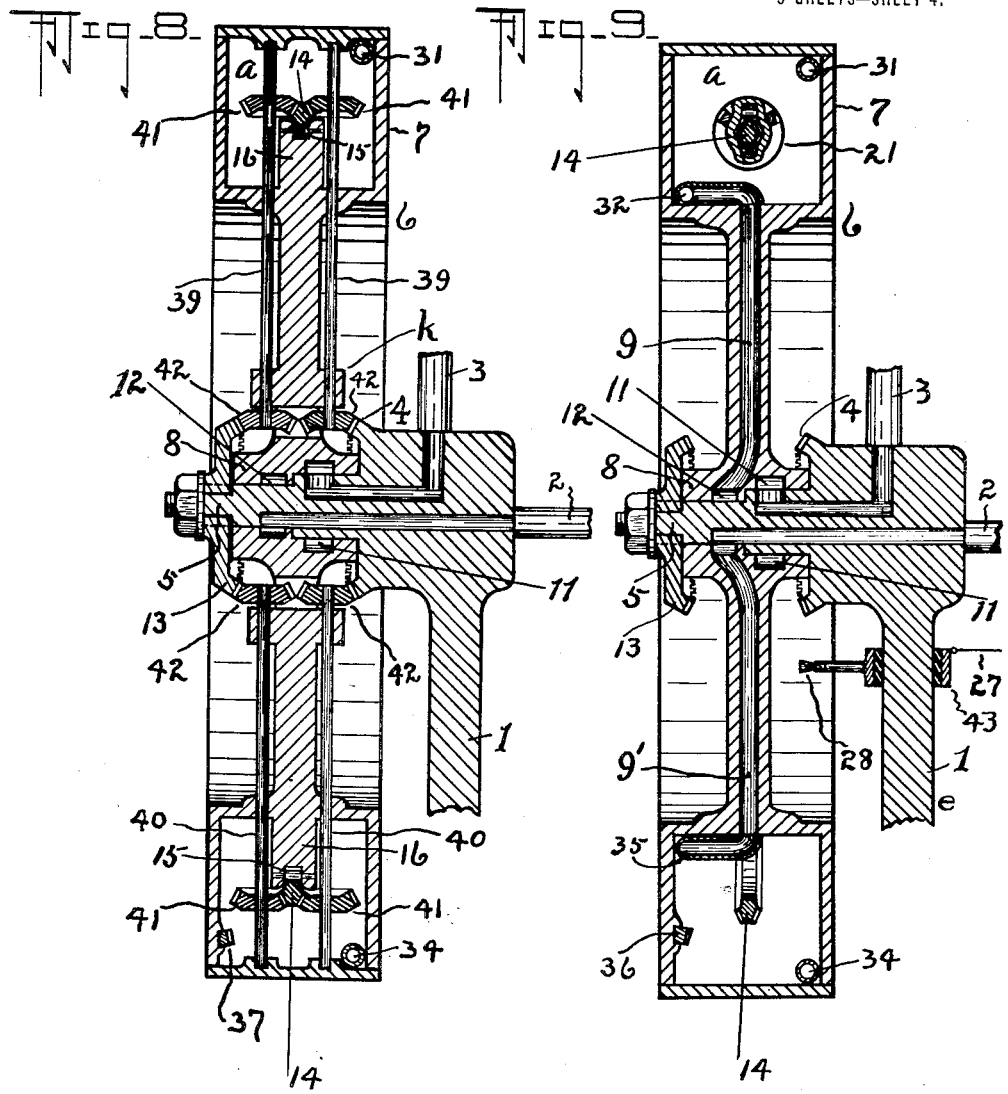

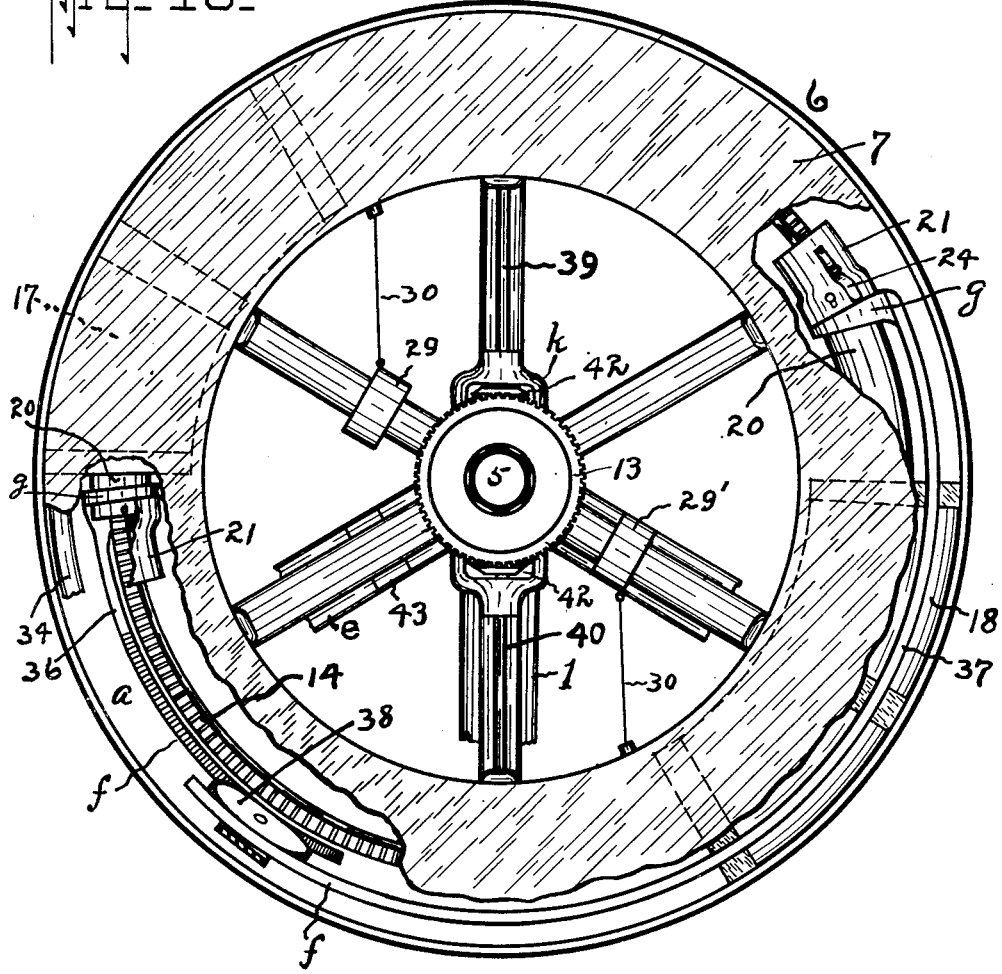

UNITED STATES PATENT OFFICE.

ALBERT C. FISCHER, OF KANSAS CITY, MISSOURI.

ENGINE.

1,349,054.  Specification of Letters Patent.  Patented Aug. 10, 1920.

Application filed February 15, 1917. Serial No. 148,878.

*To all whom it may concern:*

Be it known that I, ALBERT C. FISCHER, a citizen of the United States, residing at Kansas City, in the county of Jackson and State of Missouri, have invented certain new and useful Improvements in Engines, of which the following is a specification.

This invention relates to an engine designed for application of power at or near the periphery of a wheel or similar element for causing its rotation, the power thus applied being useful for a variety of purposes. While ignition of gas charges is employed and will be described in the present embodiment of the invention, and means are illustrated for this purpose, I do not wish to be understood as limiting myself thereto nor to details of construction, except so far as determined by the scope of the appended claims.

In the drawing, Figure 1 is an end view of a wheel, parts being broken and in section, and Fig. 2 is a view of the same in section in a plane transverse to the axis. Fig. 3 is a diametric section through the wheel on line 3 3 of Fig. 2. Fig. 4 is a transverse section through the annular casing or tire on line 4 4 of Fig. 2. Fig. 5 is a detail to illustrate construction, being a transverse section on line 5 5 of Fig. 2. Figs. 6 and 7 are enlarged, broken away details to illustrate a clutch mechanism. Fig. 8 is a diametric section through the wheel on line 8 8 of Fig. 2. Fig. 9 is a similar view to that shown in Fig. 8, the section being on line 9 9 of Fig. 2. Fig. 10 is a broken view of the engine in side elevation.

In the drawing, numerals 1 indicate a stationary part or support provided (Figs. 3, 8, 9) with a fuel intake passageway 2, an exhaust passageway 3 and a stationary, bevel gear 4, said support also providing a spindle 5 as axial bearings for the wheel or revoluble engine 6.

Numeral 7 indicates an annular casing or hollow tire for the wheel, any suitable construction being provided for connecting the tire with the hub 8, as the spokes, arranged in pairs and shown in the drawing, certain of said spokes being of tubular form to provide passageways, as the opposed passageways 9 and 9' for a movement therethrough of hydrocarbon fuel, and the opposed passageways 10 and 10' for a movement therethrough of exhaust gases, the hub 8 having an annular recess 12 providing a communication between the passageways 9 and 9' and the passageway 2 for conducting gas fuel, and having an annular recess 11 providing a communication between the passageways 10 and 10' and the passageway 3 for conducting exhaust gases. Numeral 13 indicates a stationary, bevel gear secured upon the outer end of the spindle 5, corresponding with and disposed in opposed relation to the bevel gear 4.

At 14 is indicated a double-faced, ring gear disposed substantially at the middle of the chamber *a* of the hollow tire, said gear being supported upon antifriction-rollers 15 having bearings in suitable blocks 16, with which the inner wall of the tire is provided, said ring gear being adapted to have a movement in one direction circularly of the chamber *a* while the wheel is also rotating.

The means herein shown for causing the movement mentioned for the ring gear 14, consists, in part, of a pair of cylinders 17 and 18 of segmental form, these being disposed within and suitably secured to the walls at diametrically opposed parts of the casing or tire, each being provided with a central, uniformly curved tube or way *b* of sufficient bore to permit a free movement therethrough of said ring gear 14 thus circumscribed. Each cylinder is provided with a piston 19, and at 20 is indicated a piston rod for each piston, its curvature corresponding with and circumscribing the ring gear, said pistons and piston rods having bearings upon the tubes *b* and adapted to have slidable movements thereon.

Each piston rod is provided at its outer end with a clutch consisting of a sleeve or housing 21 circumscribing the end of a piston rod 20 and having a slot 22 (Fig. 7) formed therein to permit it to have a limited longitudinal movement on the piston rod while secured to said rod by a keeper 23, the sleeve 21 being disposed to also circumscribe the ring gear 14. Each sleeve is provided with a pawl 24, and when a piston rod makes its working stroke it will engage the inner, inclined end *c* of a pawl, as best shown in Fig. 6, to cause the tooth *d* to move inwardly of the sleeve into engagement with the ring gear 14, the ring gear being moved in the same direction as the piston rod, and when a piston rod makes its compression stroke, the pawl will be automatically disengaged from the teeth of the ring gear on account of the obtuse angle employed in forming the tooth of said pawl.

Any suitable means may be provided for causing compression and working strokes of the piston rods, and for causing actuation of the pistons 19 of the respective cylinders in alternation, the means herein shown consisting, in part, of the conventional spark plugs 25 and 26 for causing ignition of gas charges in the respective cylinders 17 and 18. Preferably a two-cycle type of engine will be employed, but the form of prime mover is merely suggestive and no attempt is here made to disclose all the details which are common to engines of this type.

At 27 (Fig. 9) is shown an electrical conductor energized by any suitable means. It is suitably insulated and mounted upon the metallic part 43 of the standard e of the support 1, and is provided with a brush 28 disposed near the line of movement of the strokes which provide the passageways 10 and 10', these tubular spokes being provided with insulated, metallic parts 29 and 29', each having an electrical conductor 30 in electrical communication with a spark plug, and it will be understood that when the wheel or engine is rotating, the brush 28 will be engaged, in alternation, by the metallic parts 29 and 29' for causing ignition, in alternation, of gas charges within said cylinders.

The hydrocarbon for each charge is introduced to the cylinder 17 from the conduit 31 which communicates with the head of said cylinder 17 and with the rear end of the cylinder 18, said gas for this purpose being first introduced to the cylinder 18 from the passageway 9, and through the comparatively short, curved passageway 32 (Figs. 2, 9), provided for this purpose. When the piston rod of the cylinder 18 makes its working stroke, the gas which has entered said cylinder from passageway 32, will be forced through the conduit 31 into the cylinder 17, this being at the time the piston of cylinder 17 is making its compression stroke, and when the piston of cylinder 17 has nearly completed its stroke toward the head thereof, the gas will have been compressed and will be ignited. The heads of cylinders 17 and 18 are each provided with a check valve 33 which prevents any escape of gas from the cylinders which might occur from back pressure after the gas has entered therein.

The hydrocarbon for the cylinder 18 is conducted thereto in a manner similar to that last described. It is introduced to said cylinder directly from the conduit 34 which communicates with the head of said cylinder and with the rear end of the cylinder 17, this supply of gas coming from the passageway 9' and a passageway 35 (Figs. 2, 9).

When the piston rod of cylinder 17 moves under explosion the gas which has entered said cylinder from passageways 9' and 35 will be forced through the conduit 34 into the cylinder 18 while the piston of cylinder 18 is making its compression stroke, and when the piston of cylinder 18 has nearly completed its compression stroke toward the head thereof, the gas will be compressed and ignited. At $x$ (Fig. 1) is indicated a check valve with which each cylinder 17 and 18 is provided, said valves permitting gas to enter the cylinders for being moved through the conduits 31 and 34, but preventing return of the gas to the passageways.

The means provided for causing reverse movements of the pistons after completion of their working strokes, and for expulsion of exhaust gases consist, in part, of the pair of concentric actuating-bars extending one from each piston as shown in Fig. 10, the bars of this pair being of unequal length and indicated at 36 and 37, each having an end-portion $f$ formed, on its inner side with teeth, to operate as a rack, said toothed end-portions or racks $f$ being in constant engagement with and upon opposed parts of a pinion 38, best shown in Figs. 2, 4, 10, the inner end of each actuating-bar being mounted upon a piston rod 20, as indicated at $g$ and best shown in Fig. 10.

In operation, when the piston rod of cylinder 17 moves outwardly for causing a movement of the ring gear circularly of the tire as indicated by the arrow in Fig. 2, the rack $f$ of the actuating-bar 36 will cause the pinion 38 to rotate, and the rotation thereof will, of course, cause the actuating-bar 37 to move simultaneously and in an opposite direction to the movement of the bar 36, to cause a compression movement of the piston of the cylinder 18 for compressing the charge that is being simultaneously introduced thereto through passage 34 and getting ready for the ignition stroke of said piston 19. Exhaust of spent gases from cylinder 18 has been permitted to take place already at the end of the working stroke of piston 19 by uncovering the port $h$, this exhaust under residual pressure of the working stroke plus momentum of gases reducing the spent gases in cylinder 18 to atmosphere or below, or in other words to a sufficiently attenuated condition to avoid vitiating the incoming mixture of gas and air beyond ignition; said exhaust gases moving out of the passageways $h$, formed in the inner wall of the cylinder 18, and which communicates with passageway 10', and thence through passageways 10', 11 and 3; and when the piston rod of the cylinder 18 moves under explosion for continuing the movement of the ring gear 14 forwardly, in the direction indicated by the arrow in Fig. 2, the rack of the actuating-bar 37 will move in a corresponding direction, and will cause the pinion 38 to rotate, said rotation causing the actuating-bar 36 to move in an opposite direction to the movement of the bar 37, for causing a compression movement of the piston of the cylinder 17 the exhaust gases having previously escaped to an attenuation down to or below atmosphere under the remanent pressure of explosion; said exhaust gases moving outwardly through the passageways $h'$, formed in the inner wall of the cylinder 17, and from thence outwardly through passageways 10, 11 and 3.

As thus described, the engine or wheel is provided with devices for its revoluble movements independent of other means. In order that its movements may be in the direction of the ring gear 14 as indicated by the arrow mentioned, means are provided for a connection thereof with said ring gear, including a plurality of radially disposed shafts, arranged in pairs substantially 180 degrees apart, as the pairs 39 and 40, said shafts having bearings for their outer ends in the casing or tire 7, their inner ends having bearings in the bases $k$ of two of the spokes, their outer ends being provided with miter gears 41 for engaging the double-faced ring gear 14, their inner ends being provided with miter gears 42 in engagement with the bevel gears 4 and 13 of the hub and spindle, respectively, and it will be understood that a movement of the ring gear longitudinally of the tire or annular casing, will cause a rotation of the wheel or engine, useful as a driving power for any desired purpose.

Having fully described my invention, what I claim and desire to secure by Letters Patent is,—

1. In an engine, a support, a tire axially mounted on the support, a ring gear having bearings within the tire, radially disposed shafts provided with gears for engaging the support and ring gear, a cylinder within the tire circumscribing the ring gear, a tubular piston arranged for longitudinal reciprocation within the cylinder and circumscribing the ring gear, and a clutch connected with the piston for engagement with the ring gear to move the latter longitudinally for actuating said radially disposed shafts.

2. In an engine, a support provided with an annular rack, a tire axially mounted on the support, a ring gear loosely mounted in the tire, a shaft having gears for engaging the ring gear and annular rack, a cylinder having a central segmental tube circumscribing the ring gear, a movable piston having bearings on the segmental tube of the cylinder and provided with a tubular rod, and means on the tubular rod of the piston for coupling said rod with the ring gear, during a movement of the piston, for actuating said shaft.

3. In an engine, a support, a tire axially mounted on the support, a ring gear having bearings within the tire, radially disposed shafts provided with gears for engaging the support and ring gear, a cylinder within the tire circumscribing the ring gear, a tubular piston within the cylinder arranged for longitudinal reciprocation and circumscribing the ring gear, and a clutch slidably mounted on the piston for an engaged relation with the ring gear during a movement of the piston in one direction, to move said ring gear longitudinally for actuation of the radially disposed shafts, and for a disengaged relation with said ring gear during a movement of the piston in an opposite direction.

4. In an engine, a support provided with a spindle, a tire provided with rollers and mounted on the spindle, a ring gear mounted on the rollers of the tire, a radially disposed shaft having gears in engagement with the support and said ring gear, a cylinder stationary with the tire and provided with a central tubular part circumscribing the ring gear, a piston arranged for longitudinal reciprocation with bearings on the central tubular part of the cylinder and provided with a tubular piston-rod circumscribing said ring gear, and devices on the piston-rod for connecting it with the ring gear during a movement of the piston to cause actuation of said ring gear for rotating said radially disposed shaft.

5. In an engine, a support, a tire axially mounted on the support, a pinion within the tire, a ring gear having bearings within the tire, radially disposed shafts provided with gears for engaging the support and ring gear, cylinders within the tire and circumscribing the ring gear, tubular pistons within the cylinders arranged to be reciprocated longitudinally and circumscribing the ring gears, each piston being provided with a rod circumscribing the ring gear and having a rack-bar engaging said pinion, each rod being provided with a clutch for moving the latter in one direction to actuate the radially disposed shafts.

6. In an engine, a support provided with a spindle, and having a pair of opposed gears circumscribing the spindle, a hub on the spindle, a tire rigid with the hub, a ring gear within the tire, means for moving the ring gear longitudinally of said tire, and radially disposed shafts having toothed gears engaging the ring gear and provided with toothed gears in engagment with the gears.

7. In an engine, a support provided with gears, a tire axially mounted on the support, a ring gear loosely mounted in the tire, a pinion within the tire, shafts having gears for engaging the ring gear and gears, a pair of cylinders each having a central segmental tube circumscribing the ring gear, movable pistons each having bearings on the segmental tube of a cylinder and provided with a tubular rod, means on each tubular rod of a piston for coupling said rod with the ring gear during a movement of a piston for actuating said shafts, and a pair of rack-bars each being mounted on a tubular rod of a piston and engaging said pinion.

8. In an engine, a support, a tire axially mounted on the support, a pinion within the tire, a ring gear having bearings within the tire, radially disposed shafts provided with gears for engaging the support and ring gear, cylinders within the tire circumscribing the ring gear, tubular pistons within the cylinders circumscribing the ring gear and arranged for longitudinal reciprocation, each piston being provided with a rod having a rack-bar engaging said pinion, and a plurality of clutches each being movable with a piston for an engaged relation with the ring gear during one of its movements for moving said ring gear longitudinally to actuate the radially disposed shafts.

9. In an engine, a support provided with a spindle, a tire provided with rollers and mounted on the spindle, a pinion within the tire, a ring gear mounted on the rollers of the tire, radially disposed shafts having gears in engagement with the support and said ring gear, a pair of cylinders each being stationary with the tire and provided with a central tubular part circumscribing the ring gear, pistons arranged for longitudinal reciprocation with bearings on the central tubular parts of the cylinders and provided with tubular piston-rods circumscribing said ring gear, rack-bars engaging said pinion and movable with the piston rods, and devices on the piston-rods for connecting said rods with the ring gear during a movement of the pistons in one direction to cause actuation of said ring gear for rotating said radially disposed shafts.

10. In an engine, a support, a tire axially mounted on the support, a pinion within the tire, a ring gear having bearings within the tire, radially disposed shafts provided with gears for engaging the support and ring gear, a pair of cylinders of segmental form within the tire and circumscribing the ring gear, a pair of conduits each being in communication with the adjacent ends of the cylinders, tubular pistons within the cylinders arranged to be reciprocated longitudinally and circumscribing the ring gears, each piston being provided with a rod circumscribing the ring gear and having a rack-bar engaging said pinion, each rod being provided with a clutch for a movement thereof in one direction to actuate the radially disposed shafts.

In testimony whereof I have affixed my signature in presence of two witnesses.

ALBERT C. FISCHER.

Witnesses:
M. M. ALBERTSON,
GEORGE P. HOYT.